(12) United States Patent
Keller (10) Patent No.: US 6,895,411 B2
(45) Date of Patent: May 17, 2005

(54) PARTIAL STEPWISE REGRESSION FOR DATA MINING

(75) Inventor: Martin Keller, Vaihingen (DE)

(73) Assignee: International Business Machines Corp., Armonk, NY (US)

( * ) Notice: Subject to any disclaimer, the term of this patent is extended or adjusted under 35 U.S.C. 154(b) by 417 days.

(21) Appl. No.: 09/998,520

(22) Filed: Nov. 29, 2001

(65) Prior Publication Data

US 2002/0120591 A1 Aug. 29, 2002

(30) Foreign Application Priority Data

Nov. 29, 2000 (EP) .......................................... 00128771

(51) Int. Cl.[7] .............................. G06F 17/00; G06F 7/00
(52) U.S. Cl. ........................................ 707/200; 707/5
(58) Field of Search .............................. 707/1–10, 102, 707/200, 104.1

(56) References Cited

U.S. PATENT DOCUMENTS 5,701,395 A * 12/1997 Stuckman et al. ............ 706/25
5,906,903 A * 5/1999 Mimotogi ..................... 430/30
6,405,195 B1 * 6/2002 Ahlberg ......................... 707/4

* cited by examiner

Primary Examiner—Luke S Wasseem
Assistant Examiner—Susan Rayyan
(74) Attorney, Agent, or Firm—Richard M. Goldman (57) ABSTRACT

A computerized data mining method for determining a prediction model for a dependent data mining variable based on a multitude of independent data mining variables, comprising replacement of the independent data mining variable with potential values from a global range by a multitude of independent local data mining variables, each relating to potential values from a sub-range of the global range. The method further comprises an initialization step and a looping sequence that includes steps of determining for every independent local data mining variable not yet reflected in the current prediction model a multitude of partial regression functions, determining for each of the partial regression functions a significance value, selecting the most significant partial regression function and the corresponding not yet reflected local data mining variable, and adding the most significant partial regression function to the current prediction model.

14 Claims, 3 Drawing Sheets

FIG. 1

The Linear Regression fitting:

The Stepwise Polynomial Regression fitting:

The Partial Stepwise Polynomial Regression fitting:

Fig. 2

| Execution mode | Number of regions in the final model | $R^2$ |
|---|---|---|
| Standard | 18 | 0,997138 |
| Model optimization | | |
| Adjusted R square | 9 | 0,912805 |
| Stepwise 0.3 | 15 | 0,998117 |
| Stepwise 0.4 | 16 | 0,998752 |

Fig. 3

PARTIAL STEPWISE REGRESSION FOR DATA MINING

FIELD OF THE INVENTION

The present invention relates to the computer technology of the area of data mining. More particularly the presented invention relates to the data mining problem of predicting a given dependent variable using a multitude of independent variables.

DESCRIPTION OF RELATED ART

Over the past two decades there has been a huge increase in the amount of data being stored in databases as well as the number of database applications in business and the scientific domain. This explosion in the amount of electronically stored data was accelerated by the success of the relational model for storing data and the development and maturing of data retrieval and manipulation technologies. While technology for storing the data developed fast enough to keep up with the demand, little attention was paid to developing software for analyzing the data until recently, when companies realized that hidden within these masses of data was a resource that was being ignored. The huge amounts of stored data contain knowledge about a number of aspects of their business waiting to be harnessed and used for more effective business decision support. Database Management Systems used to manage these data sets at present only allow the user to access information explicitly present in the databases i.e. the data. The data stored in the database is only a small part of the 'iceberg of information' available from it. Contained implicitly within this data is knowledge about a number of aspects of their business waiting to be harnessed and used for more effective business decision support. This extraction of knowledge from large data sets is called Data Mining or Knowledge Discovery in databases and is defined as the non-trivial extraction of implicit, previously unknown and potentially useful information from data. The obvious benefits of Data Mining have resulted in a lot of resources being directed towards its development.

Data mining involves the development of tools that analyze large databases to extract useful information from them. As an application of data mining, customer purchasing patterns may be derived from a large customer transaction database by analyzing its transaction records. Such purchasing habits can provide invaluable marketing information. For example, retailers can create more effective store displays and more effective inventory control than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a particular time period after the first purchase.

An important problem within this area of technology is the problem of predicting a given dependent data mining variable using a multitude of independent data mining variables. Typically a multitude of records is available representing expressions of a particular, yet unknown functional relationship between the independent variables and a dependent data variable. The difficulty is to use said multitude of records as training set for deriving the unknown functional relationship between the independent and the dependent variables, which can serve as a prediction model. Then the prediction model can be used to determine for all possible values of the independent variable the value of the dependent variable. On one hand the prediction model should be able to reproduce the values of the training set as well as possible, on the other hand the prediction model allows one to determine and thus to predict the value of the independent variable for value combinations of the independent variables not comprised by the training set.

The most common prediction methodology in data mining is the multiple linear regression approach and the so-called multiple polynomial regression approach, with the former representing a special case of the latter. The first category uses one and the same continuous function for each independent variable based on the assumption of a linear relationship between the dependent variable and one or more independent variables. Multiple polynomial regression assumes a certain polynomial relationship between the dependent and the independent variables and thus can be viewed as an extension of the multiple linear regression methodology. Multiple polynomial regression is a regression methodology that fits and approximates a given dependent variable y with n independent variables $X_i$ based on a fitting model that uses a polynomial of a certain predefined degree m common for all independent variables. Thus the assumed polynomial degree for each independent variable is identical.

A simplified multiple polynomial regression model according to the state of the art is of the following form:

$$y = A + \sum_{i=1}^{n} f(Xi) + Error \qquad (eq.\ 1)$$

where $f(X_i) = B_{i1}*X_i^1 + B_{i2}*X_i^2 + \ldots + B_{im}*X_i^m$, y is the dependent variable, $X_i$ are the independent variables, A and $B_i$ denote the unknown coefficients. So-called "linkage terms" of the independent variables (for instance the linkage terms for 2 independent variables and a polynomial degree of 3 are $X_1*X_2$, $X_1^2*X_2$, $X_1*X_2^2$) are not introduced for convenience.

Both of the above mentioned methodologies suffer from deficiencies relating to the same cause. As the actual polynomial degree of the functional relationship of the dependent and the independent variables is not known and both methods are based on a fixed assumed functional relationship—the multiple linear regression approach assuming a linear functional relationship and the multiple polynomial regression approach assuming a function relationship of a common predefined polynomial of degree m for all independent variables—their results are not satisfactory. Prediction models based on a multiple linear regression approach fail to predict non-linear functional relationships in an acceptable manner. Prediction models based on a multiple polynomial regression approach generally will generate unsatisfactory results if the assumed common polynomial degree m deviates from the actual functional relationship. In these cases prediction quality (of an actual functional relationship of polynomial degree K approximated by a polynomial of degree m) fits only well in a close neighborhood of the trained data areas. This deficiency even increases by increasing the degree m for the fitting polynomials.

Moreover, the multiple polynomial regression approach is characterized by poor computational efficiency. It always has to compute polynomials for the independent variables with an assumed maximum polynomial degree m even if the functional relationship is of simpler form (for instance linear); the computational process of determining said polynomials as well as the process of evaluating the polynomial suffers from this drawback.

SUMMARY OF THE INVENTION

The present invention teaches a computerized data mining method for determining a prediction model for a dependent data mining variable based on a multitude of n independent data mining variables.

The method comprises a variable replacement step replacing the independent data mining variable with potential values from a global range by a multitude of independent local data mining variables. Each independent local data mining variable relates to potential values from a sub-range of the global range.

The method further comprises an initialization step initializing a current prediction model and a looping sequence. The looping sequence comprises a first step of determining for every independent local data mining variable not yet reflected in said current prediction model a multitude of partial regression functions (depending only on one of the independent local data mining variables); and of determining for each of the partial regression functions a significance value; and of selecting the most significant partial regression function and the corresponding not yet reflected local data mining variable. The looping sequence comprises a second step of adding said most significant partial regression function to the current prediction model.

The proposed method achieves improved prediction quality within the training data areas without losing the stability for the untrained data areas. Moreover, the proposed teaching of the current invention is able to detect different functional dependencies of the dependent data mining variable within different sub-ranges of an independent data mining variable by introducing a multitude of local data mining variables. This capability is most important to cope with dependent variables occurring in practical applications which are very often characterized by varying functional dependencies within the individual sub-ranges of the independent variables.

DESCRIPTION OF THE PREFERRED EMBODIMENT

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or a computer program in the present context means any expression, in any language, code or notation, of a set of instructions intended to cause a system having an information processing capability to perform a particular function either directly or after either or both of the following a) conversion to another language, code or notation; b) reproduction in a different material form.

The current invention is using term "data mining" in its most general meaning generically referring to all types of mining technologies which sometimes are distinguished further in "data mining" and "text mining".

1.1 The Stepwise Polynomial Regression Methodology

A significant improvement has been made available by a commonly-assigned patent application, Stepwise Polynomial Regression, U.S. Pat. Ser. No. 09/608,468, which is incorporated herein by reference.

Stepwise Polynomial Regression uses a set of polynomials, but for each independent variable the 'best' fitting polynomial is selected. The 'best' fitting polynomial shows the least squared error of the predicted and the observed values from the dependent variable. Actually the best fitting polynomial is determined according to a significance measure. The regression formula of Stepwise Polynomial Regression is:

$$y = A + \sum_{i=1}^{n} f(Xi) + Error \quad \text{(eq. 2)}$$

where $$f(X_i) = \begin{cases} \text{select one of} & \begin{array}{c} B_{i1} * X_i^1 \\ B_{i1} * X_i^1 + B_{i2} * X_i^2 \\ \ldots \\ B_{i1} * X_i^1 + B_{i2} * X_i^2 + \ldots + B_{iM} * X_i^M \end{array} \end{cases}$$

and where y is the dependent variable, $X_i$ are the n independent variables, A and $B_{ij}$ denote the unknown coefficients, M is maximum degree for the potential regression polynomials; from within this multitude of potential regression polynomial the most significant one is selected to be used as the actual prediction model.

In spite of all improvements provided by this technology, predictors determined according to stepwise polynomial regression suffer from the deficiency that a functional relationship can be described only by one of the provided continuous functions. In reality there are situations where an dependent variable has to be described by different functional dependencies in different areas of the overall range of the independent variables. The above mentioned teaching would be able to generate only a compromise solution as a prediction model. Moreover, noncontinuous relationships or functional relationships which are not part of the provided set of regression polynomials can only be approximated in a limited manner. In addition, if the maximum polynomial degree is increased in the Stepwise Polynomial Regression approach to increase the spectrum of potential functional dependencies, it can be observed that this decreases the stability of the prediction model for data which are not in the neighborhood of the trained data areas.

Thus it can be observed that even the current Stepwise Polynomial Regression methodology requires further improvements.

1.2 The Partial Stepwise Polynomial Regression Methodology

Figure 1:
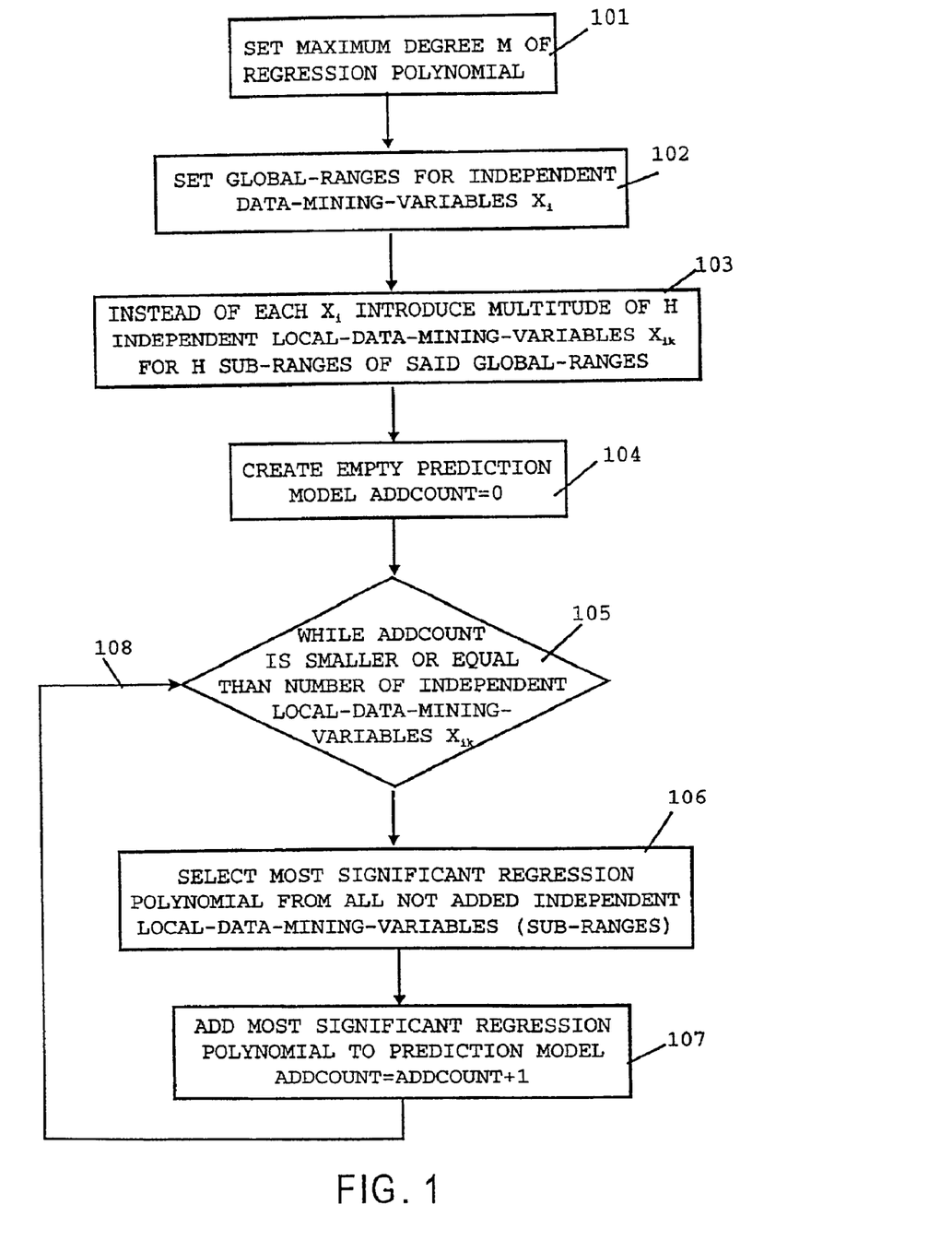
FIG. 1 is a flow chart depicting in more details the mode of operation of the partial stepwise polynomial regression methodology in a preferred embodiment of the invention based on the calculation of specific regression functions, namely regression polynomials.

For an explanation of a further embodiment of the current invention relating to the specific technology of calculating a regression function, the focus of the discussion is put temporarily on FIG. 1. FIG. 1 is a flow chart depicting in more details how according to a preferred embodiment of the invention a regression function is calculated by an iteration process. FIG. 1 concentrates as a first approach on the calculation of specific regression functions, namely regression polynomials. In the next chapter an extension to general regression functions will be described.

The current invention proposes a new methodology for determining a prediction model for data mining variables which is called Partial Stepwise Polynomial Regression.

The invention proposes two major approaches. The partial stepwise polynomial regression using a fixed number of ranges or regions for each independent variable and a dynamic approach using variable number of ranges or regions for each independent variable. The fixed number approach does not result in region intervals with the same length. In contrast to that it is explicitly noted that the variable region number approach will result in variable region intervals and variable number of regions.

1.2.1 The Partial Stepwise Polynomial Regression Methodology with a Fixed Number of Regions Partial Stepwise Polynomial Regression with a fixed number of regions is an enhanced regression method further improving the stepwise polynomial regression approach. Stepwise polynomial regression predicts the value of the dependent variable on the basis of n independent variables, where each independent variable is expressed by a single continuous polynomial with its individual polynomial degree over the complete range of each independent variable.

According to a fundamental observation leading to the current invention it is pointed out that in practical situations the functional dependency of a dependent variable on a set of independent variables very often is of a nature not allowing to approximate for prediction purposes that dependent variable with a prediction model which is identical throughout the whole range of the values of the independent variables. This situation is caused by a multitude of reasons. For instance, within a first sub-range of an independent variable the functional dependency to the dependent variable may be of a first type while in another sub-range the functional dependency may be of a second type. Also it might be possible that the functional dependency shows discontinuities. Due to these reasons a dependent data mining variable within typical applications cannot be approximated by a prediction model which is identical throughout the whole range of values of the independent variables. Therefore a methodology is suggested which is able to provide multiple partial regression functions for each independent variable. Instead of using an identical analytical function for the complete data area, that is the complete range, of an independent variable, the data area (range) is split up into regions or sub-ranges. Each region/sub-range is contributing its own continuous prediction function to the overall prediction model. This results in a prediction function for each independent variable which is determined by multiple different analytical functions. Each region/sub-range has it own prediction function to describe the relationship for the specific data area. Expressed in other words, an independent data-mining variable with potential values from a global-range is replaced by a multitude of independent local-data-mining-variables, each independent local-data-mining-variable with potential values from a sub-range of said global-range.

The above teaching may not be merely reduced to modeling a functional dependency on a global range of the independent variables by simply breaking it up into a multitude of prediction models dedicated to the individual sub-ranges of the global-range. As the individual sub-ranges of the independent variables are represented by independent local-data-mining-variables participating within the iteration process described below, each individual sub-range of each individual independent data mining variable with its associated prediction model is competing independently from one another for recognition within the selection process based on its significance to the overall prediction model. This results in an optimization approach going far beyond the normal stepwise polynomial regression methodology.

Thus Partial Stepwise Polynomial Regression suggests the use of multiple polynomials of potentially different degrees for each independent variable. Each polynomial describes a partial data area—called region or sub-range—of an independent variable. The invention proposes a technique allowing to determine individually a partial relationship for each region of an independent variable. The partial regression polynomials determined along these lines are combined to form the overall prediction model for the independent variable.

Assuming a maximum degree M for the potential regression polynomials and H regions for each independent variable, the Partial Stepwise Polynomial Regression method may be expressed with the following formula:

$$y = A + \sum_{i=1}^{n} f(Xi) + Error \quad \text{(eq. 3)}$$

where $$f(X_i) = \sum_{k=1}^{H} f(Z_{ik})$$

$$\left\{ \begin{array}{c} Z_{ik} = Xi; reg_{i0} < Z_{i1} < reg_{i1} \text{ else } reg_{ik-1} \leq Z_{ik} < reg_{ik} \\ Z_{ik} = 0 \end{array} \right\}$$

and where y is the dependent variable, $X_i$ are the independent variables, k is the index number of regions, $Z_{ik}$ are the independent variables of specific regions where $reg_{ik}$ determines the upper border of region k.

For each $$f(Z_{ik}) = \left\{ \text{select one of} \begin{array}{c} B_{ik1} * Z_{ik}^1 \\ B_{ik1} * Z_{ik}^1 + B_{ik2} * Z_{ik}^2 \\ \ldots \\ B_{ik1} * Z_{ik}^1 + B_{ik2} * Z_{ik}^2 + \ldots + B_{ikM} * Z_{ik}^M \end{array} \right\}$$

where A and $B_{ikj}$ denote the unknown coefficients. Partial Stepwise Polynomial Regression determines region specific regression polynomial, i.e. the fitting curve (eq. 3), in such a manner, that for each region from all potential regression polynomials up to a maximum degree M a specific regression polynomial is selected. The combination of all region specific polynomials determines the regression function of an independent variable. The sum of all regression functions from the independent variables is the regression function for the dependent variable.

FIG. 1 visualizes a summarizing overview on the proposed Partial Stepwise Polynomial Regression methodology by a flow diagram.

Partial Stepwise Polynomial Regression starts by setting the maximum polynomial degree 101 M. This step limits the set of regression polynomials from which the method selects the most significant one.

Within step 102 the global-ranges for the independent data-mining-variables $X_i$ are set.

In step 103 the number of regions/sub-ranges H are set and the H regions themselves are determined for each independent variable. This step can be viewed as a variable-replacement-step replacing the independent data-mining variable with potential values from a global-range by a multitude of new independent local-data-mining-variables, each independent local-data-mining-variable with potential values from a sub-range of said global-range. In "ex post" observation with the current invention it turned out that in addition to the number of regions H, the determination of the regions themselves causes the most impact to the prediction quality of the finally determined prediction model.

Within an initialization step 104 a current prediction model is initialized. In most cases the method starts with an empty prediction model, which means that none of the regions of the independent variables is represented by a regression polynomial in its functional relationship with the independent variable.

The steps 105 to 108 represent a looping sequence which can be repeated until a certain termination criterion is fulfilled. Within step 105 the method determines, if all independent candidate regions, i.e. the sub-ranges, have been reflected already in the current version of the prediction model. This can be achieved by just counting the number of already reflected regions/sub-ranges. Within step 106 for every region/sub-range not yet reflected in the prediction model a multitude of regression polynomials with different polynomial degrees is determined based on the set of training data. In the most far-reaching embodiment of the invention, for every not reflected region all regression polynomials according to eq. 3 of all degrees up to the maximum degree M are determined. Next, for each of said candidate polynomials their significance value is determined. The significance measures, based on the set of training data, the degree of improvement of the current prediction model, if a regression polynomial would be added to the prediction model. The significance is thus a measure of the appropriateness of a regression polynomial to reflect the functional relationship with the dependent variable, i.e. showing the "closest" relationship with the dependent variable. Within step 107 the most significant potential regression polynomial according to this significance measure and its corresponding region is then selected and added to the current prediction model, thus reflecting said region of an independent variable within the prediction model.

Within step 108 the method checks the fulfillment of a termination criterion. According to a basic implementation of the invention the termination criterion is a test whether all regions of all independent variables have been included in the prediction model by contributing a regression polynomial. The final prediction model at the point in time when the method terminated represents the prediction model as determined by the invention.

It is important to recognize that the suggested methodology is able to remove the constraint that a regression polynomial of an independent variable must have a higher polynomial degree to describe more complex relationship. Moreover the invention even allows one to describe non-polynomial relationships, for instance the Gaussian relationship.

1.2.2 The Region Determination

The region borders of the i'th independent variable are defined as $$reg_{ik} = \left\{ \begin{array}{ll} -\infty & k < 1 \\ C_i - dI_i/2 + \dfrac{dI_i}{H} * k & k \geq 1, k < H \\ \infty & k = H \end{array} \right\} \quad \text{(eq. 4)}$$

where H defines the maximum number of regions, $dI_i$ determines the definition interval for the region borders, i.e. the global range, and $C_i$ is a specific center of the i'th independent variable. Various methods to define such a center are possible; one most successful, concrete definition for the center is given below.

A specific implementation of a region determination according to the current invention is based on the following features.

The most significant measures describing distributions of data are the mean value and the standard deviation.

The mean value is defined as $$Z_{Mean} = \dfrac{\sum_{i=1}^{n} Z_i}{n} \quad \text{(eq. 5)}$$

the number of observations is n and the standard deviation is the square root of the empirical variance $s=\sqrt{S}$ with the empirical variance $$S = \dfrac{\sum_{i=1}^{n} (Z_i - Z_{Mean})^2}{(n-1)} \quad \text{(eq. 6)}$$

Assuming the mean value of the i'th independent variable as center $C_i$ the definition interval $dI_i$ for the region borders as four times of its standard deviation $s_i$ this results in a specific region determination of $$reg_{ik} = \begin{cases} -\infty & k < 1 \\ Z_{i\,Mean} - 2s_i + \frac{4s_i}{H} * k & k \geq 1, k < H \\ \infty & k = H \end{cases} \quad \text{(eq. 4.1)}$$

1.2.3 The Significance Measure

As a first observation the significance measure of a regression polynomial for a region of an independent variable is reduced to the simpler problem of a significance measure of the individual powers of a regression polynomial.

According to a preferred implementation the significance of a polynomial is >=the minimum significance of all its linear predictors:

$$B_{ik1}* Z_{ik}^1, B_{ik2}*Z_{ik}^2, \ldots, B_{ikM}*Z \quad \text{(eq. 7)}$$

Thus the significance of a regression polynomial is determined by the smallest significance of any of its powers.

Starting from this definition a significance measure for the linear predictors is required. For the linear predictors, the invention suggests to exploit the F-test to test whether a predictor influences the dependent variables or not. The F-test is a statistical test, well-known in the statistics, that checks whether two estimates of the variance of two independent samples are the same. In addition, the F-test checks whether the so-called NULL hypothesis is true or false. In application to the current situation assuming the inverse hypothesis, that "a predictor has no influence on the dependent variable", this leads to the following NULL hypothesis for the F-test: "a coefficient $B_{ikj}$ in a linear regression model (with respect to the various $B_{ikj}$) is zero".

For a single linear predictor the test statistic is $$F = (B_{ikj}^2)/(S_{Z_{ik}Y}^2 * S_{Z_{ik}}^2) = t^2$$

with a degree of freedom of (n−2) where $S_{Z_{ik}Y}$ is the empirical covariance between $Z_{ik}$ (a region of an independent variable) and Y (the dependent variable) and $S_{Z_{ik}}$ is the empirical variance of the region variable $Z_{ik}$. In this special case the T-statistic t is equal to the root of the F-statistic. This remark indicates that also other statistical measures (like the T-Test) could be used as foundation for the significance measure approach of the current invention.

From the perspective of a practical computation, the F-Test value of a certain regression polynomial the F-Test value is determined on the basis of tentatively adding the regression polynomial to the current prediction model and on the basis on the training data set.

Based on this calculated F-test value the probability of obtaining a larger F-test value (Probability>F) can be determined according to the statistic theory of the F-test. If this probability tends to zero there is a statistical evidence for rejecting the NULL hypothesis. Or in other words: the more the F-test value approaches the value of 1, the larger is the support that the NULL hypothesis is true, indicating a small significance of the corresponding linear predictor (power of the regression polynomial); vice versa: the more the F-test value approaches the value of 0, the larger is the support that the NULL hypothesis is false, indicating a large significance of the corresponding linear predictor.

Thus the invention proposes as significance measure of a linear predictor to use the (Probability>F) value based on the F-test theory.

1.2.4 Partial Stepwise Polynomial Regression Conditionally Adding Regions (Sub-Ranges) of Independent Variables Partial Stepwise Polynomial Regression allows for several optimization strategies of the methodology depending on the particular objective. The proposed improvements are targeted at reducing the number regions (sub-ranges) from the independent variables which contribute to the prediction model. Stated in other terms, the improvements of the method will reflect not all of the possible regions (sub-ranges) within the prediction model and will limit the number of regions to those which contribute to a "larger degree" to the functional relationship with the dependent variable. The coefficients of the eliminated regions are zero.

A first improvement of Partial Stepwise Polynomial Regression will add regions to the set of regions reflected in the prediction model conditionally only. This first improvement is exploiting the so-called adjusted R square measure also called adjusted correlation coefficient. The adjusted R square measure is well known within the state of the art.

This first improvement results in an enhanced step 107 of FIG. 1. Instead of unconditionally adding the most significant regression polynomial to the prediction model, it is first determined, if its inclusion would improve the adjusted correlation coefficient of the resulting prediction-model with respect to the set of training data. Only in the affirmative case that regression polynomial and the corresponding region is added to the prediction model. Otherwise the corresponding region is excluded from said method without further participation in the iteration process.

More particularly, if step 106 indicates the most significant regression polynomial and its corresponding region and if this region is the j-th region to be added to the prediction model, the selection criteria for actual adding this region to the prediction model is:

$$R'^2_j > R'^2_{j-1} \quad \text{(eq. 8)}$$

where the adjusted R square coefficient R' for linear predictors is:

$$R'^2_p = 1 - (q-1)/(q-p-1)*(1-R^2) \quad \text{(eq. 9)}$$

where $R^2$ is the squared correlation coefficient with respect to the fitted and observed values, q is the number of observations (i.e. the number of training records), p is the number of independent predictors comprised by the regression polynomials within the current prediction model. In other words, the number of independent predictors p is equal to the number of the unknown coefficients $B_{ikm}$.

The correlation coefficient R is calculated by dividing the covariance from the observed (i.e. according to the training data) and the predicted values with the variance from the observed values and the variance from the predicted values. Therefore $$R = S_{yy'}/(S_y S_{y'}) \quad \text{(eq. 10)}$$

where $S_{yy'}$ is the empirical covariance of Y and Y' which is determined by $$S_{yy'} = \left(\sum_{i=0}^{q} (Y_i - Y_{Mean})(Y'_i - Y'_{Mean})\right) \bigg/ (q-1) \quad \text{(eq. 11)}$$

and where $Y_i$ are the observed values of the dependent variables and Y' are the predicted values.

As a result the Partial Stepwise Polynomial Regression with adjusted R square optimization eliminates all regions which do not improve the adjusted correlation coefficient, i.e. which do not improve the prediction model. As an important computational advantage this results in a prediction model requiring a smaller number of regions. Only those regions which improve the prediction quality will become part of the prediction model.

1.2.5 Partial Stepwise Polynomial Regression Conditionally Adding and Removing Regions A second improvement of Partial Stepwise Polynomial Regression will likewise add regions conditionally only to the set of regions reflected in the prediction model. Moreover it also will remove regions from the prediction model again in case of certain conditions. Thus the second improvement is targeted to determine a prediction model with as few regions as possible.

This second improvement results in an enhanced step (106) of FIG. 1. Instead of unconditionally adding the most significant regression polynomial to the prediction model, it is first determined if the significance of the currently most significant regression polynomial is above a predefined threshold significance value. In the affirmative case, only said currently most significant polynomial is added to the prediction model. Additionally, this second improvement of the invention enhances the looping sequence reflected in FIG. 1 by a third step succeeding step 107. Within this new step it is determined if the significance of a certain regression polynomial (or a multitude of regression polynomials) comprised within the current prediction model is reduced after the last regression polynomial has been added to the prediction model. If this is the case, said certain regression polynomial together with its corresponding region is removed from the current prediction model. Though this region is no longer reflected in the prediction model, it may of course participate within the further iteration process; i.e. a removed region can be added again in one of the next steps of the iteration. Another alternative handling is to exclude a region, which once has been removed from the prediction model, from said method without further participation in the iteration process.

These steps (adding, removing of regions) are repeated until all regions whose significance is higher than the specified threshold significance value are added to the model. This algorithm is called stepwise regression with full forward (adding regions) and backward (removing regions) capabilities. Expressing the termination criterion in other words, the looping sequence is terminated if the significance of the currently most significant regression polynomial is below said threshold significance.

With respect to the comparison of significance values it has to be stressed that the significance of a variable is higher if its (Probability>F) value tends to zero. That means, a variable is added when its (Probability>F) value is lower than the given significance threshold.

As the result of this second improvement the suggested methodology provides the possibility to find a prediction model in terms of minimizing the number of required regions. This results in a minimization of independent variables.

1.3 Extension of the Invention to Categorical Variables

Besides operating on data mining variables being numeric in nature, the proposed methodology can be enhanced to also handle so-called categorical variables. Categorical variables are variables which can have a value out of a set of discrete values. A categorical variable will be converted into a vector wherein the vector elements are treated like independent variables representing the potential values of the categorical variable. Thus a categorical variable is treated as a [0,1] vector of its potential values.

For instance the categorical variable X having n members, i.e. n vector elements ["member_1", "member_2" . . . , "member_n"] is mapped to the independent variables (i.e.) predictors):

X("member_1")=[0,1]

X("member_2")=[0,1]

. . .

X("member_n")=[0,1]

1.4 Example of a Prediction Model According to the Current Invention

In the following, a comparison of the results of linear regression, stepwise polynomial regression and partial stepwise polynomial regression (according to the current invention) applied to the same training data set is presented. Based on the training data set all regressions predict the independent (mining) variable "income/capital" from the three independent variables (the concrete nature of these variables is not important for the current explanation):

[AGRI, SERVICE, INDUS]

Figure 2:
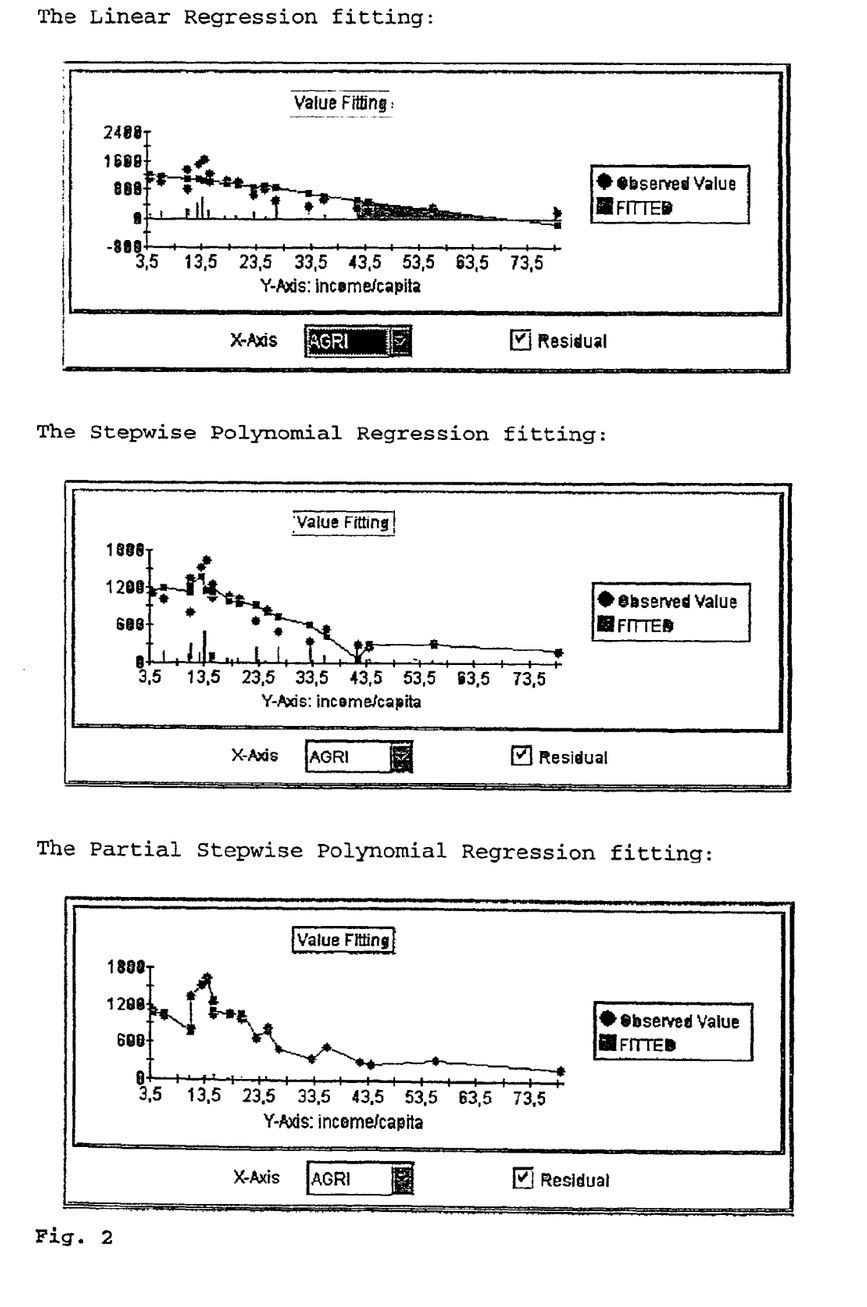
FIG. 2 visualizes the calculated prediction models according to various approaches (including that of the current invention) in comparison to the training data by indicating the differences between the values of the training data and the calculated values according to the prediction model (residuals).

All independent variables are numeric. The results of each prediction model is shown in FIG. 2. FIG. 2 visualizes the fitting curve showing the residuals (that is, the deviation between the exact values of the independent variable and its value according to the prediction model) of the observed values versus the predicted values.

The prediction model generated according to the linear regression method resulted in a $R^2$ of 0.634596, where $R^2$ is the squared correlation coefficient between observed and fitted values, and the following prediction model:

$$income/capital = \qquad\qquad\qquad\text{(sample 1)}$$
$$-4660.13211905839 + 40.9309547592514 * AGRI +$$
$$59.239686679445 * SERVICE +$$
$$59.8879962521713 * INDUS$$

The prediction model generated according to the Stepwise Polynomial Regression methodology resulted in an $R^2$ of 0.796181 and the following prediction model:

$$income/capital = \qquad\qquad\qquad\text{(sample 2)}$$
$$-11771.9127789895 - 3.28336940177977 * AGRI^2 +$$
$$0.0469395359133741 * AGRI^3 +$$
$$287.254225684245 * INDUS -$$
$$7.66112617982519 * INDUS^2 +$$
$$0.057519013287087 * INDUS^3 +$$
$$1123.30302703306 * SERVICE -$$
$$35.2179332880916 * SERVICE^2 +$$
$$0.346957993399851 * SERVICE^3$$

The prediction model generated according to the Partial Stepwise Polynomial Regression methodology resulted in an $R^2$ of 0.997138 and the following prediction model:

(sample 3)

$$\begin{aligned}
\text{income/captial} = {} & 406.178558348123 + \\
& 26.337989486862 * (AGRI >= 7.145 \text{ and } <25.6) - \\
& 45.450827692626591 * (AGRI >= 7.145 \text{ and } <25.6)^2 + \\
& 833.49621951468 * (AGRI >= 25.6 \text{ and } <44.0544) - \\
& 45.450827692626591 * (AGRI >= 25.6 \text{ and } <44.0544)^2 + \\
& 0.600474152375959 * (AGRI >= 25.6 \text{ and } <44.0544)^3 - \\
& 20.5338136610743 * (AGRI >= 44.054) + \\
& 14.5607462031416 * (INDUS < 31.580) + \\
& 444.293086313939 * (INDUS >= 43.35 \text{ and } <55.319) - \\
& 22.2991534042399 * (INDUS >= 43.35 \text{ and } <55.319)^2 + \\
& 0.263576382781448 * (INDUS >= 43.35 \text{ and } <55.319)^3 + \\
& 216.7300647299952 * (SERVICE < 22.607) - \\
& 9.0408896205051 * (SERVICE < 22.607)^2 - \\
& 176.731141985718 * (SERVICE >= 31.15 \text{ and } <39.69) + \\
& 8.6463067407576 * (SERVICE >= 31.15 \text{ and } <39.69)^2 - \\
& 0.0869526250292018 * \\
& (SERVICE >= 31.15 \text{ and } <39.69)^3 - \\
& 419.782430750505 * (SERVICE >= 39.69) + \\
& 21.5409362796845 * (SERVICE >= 39.69)^2 - \\
& 0.26503551689648 * (SERVICE >= 39.69)^3
\end{aligned}$$

As can be seen from the comparison of the resulting prediction models visualized within FIG. 2, the Partial Stepwise Polynomial Regression approach has been able to detect for certain regions, i.e. sub-ranges, very precisely the different functional relationships between the independent data mining variables and the dependent data mining variable differing from sub-region to sub-region. One example in this respect is the variable "AGRI"; in this case the Partial Stepwise Polynomial Regression approach moreover denied a polynomial functional contribution for the region (AGRI>=44.054) in contradiction to the prediction model generated by the Stepwise Polynomial Regression approach.

1.5 Comparision of Certain Partial Stepwise Polynomial Regression Variants

Figure 3:
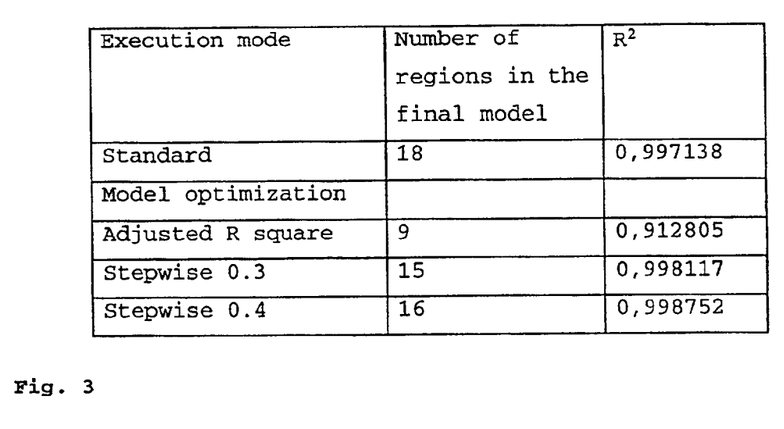
FIG. 3 shows for a certain example a comparison of the prediction models determined according to various variants of the Partial Stepwise Polynomial Regression methodology.

Based on the training data set of the previous chapter with the problem of determining a prediction model for the dependent variable "income/captial" dependent on the 3 independent variables, the prediction models determined according to various variants of the Partial Stepwise Polynomial Regression methodology are compared in FIG. 3. FIG. 3 reflects the squared correlation coefficient "R square", the "number regions", i.e. the number of sub-ranges and their corresponding independent local data mining variables, selected as most appropriate for the model versus the following Partial Stepwise Polynomial Regression variants:

the standard Partial Stepwise Polynomial Regression method ("Standard")

the Partial Stepwise Polynomial Regression conditionally adding independent variables based on the adjusted correlation coefficient ("Adjusted R square")

the Partial Stepwise Polynomial Regression conditionally adding and removing independent variables based on the significance threshold of 0.3 ("Stepwise 0.3")

the Stepwise Polynomial Regression conditionally adding and removing independent variables based on the significance threshold of 0.4 ("Stepwise 0.4")

By referring to FIG. 3 the standard Partial Stepwise Polynomial Regression algorithm will predict the dependent data mining variable "income/captial" with a $R^2=0.997138$. Using the adjusted R squared optimization results in a decrease of the prediction quality to $R^2=0.912805$, but requiring only 9 regions (instead of 18). Finally Partial Stepwise Polynomial Regression conditionally adding and removing regions with a significance threshold of 0.3 results in a prediction quality of $R^2=0.998117$ with 15 regions. By increasing the significance threshold from 0.3 to 0.4 (remember: a reduction of the numerical value corresponds in a lowering of the significance level of the threshold) the prediction quality slightly increases to $R^2=0.998752$ but the number of regions also increases from 15 to 16.

Thus, the standard Partial Stepwise Polynomial Regression methodology may be further improved in terms of the prediction model quality by the two variants. Most remarkably is that both variants lead to a reduction of the number used regions and this leads to a reduction of the number of independent variables, but there is a major usage differentiation. While adjusted R squared optimization does not need any user knowledge, the conditionally adding and removing regions function requires a deeper knowledge of the prediction result quality.

1.6 Partial Stepwise Polynomial Regression with Variable Number of Regions

Partial Stepwise Polynomial Regression with variable number of regions is an enhanced regression method improving the partial stepwise polynomial regression with fixed number of regions approach. Partial Stepwise Polynomial Regression with fixed number of regions predicts the value of the dependent variable on the basis on n independent variables. Each independent variable is expressed by a fixed number of polynomials, one polynomial per region. The number of regions is fixed and each of them has potentially different polynomial degrees. This further embodiment of the invention proposes a new technique in addition, allowing to determine the number and sizes of regions/sub-ranges for each independent variable individually.

Assuming a maximum degree M for the potential regression polynomials and $H_{Max}$ as maximum number of regions (not a fixed number H as in the previous embodiment) for each independent variable; this also means, that the final number of sub-regions for the individual independent variables may be different from one another. Partial Stepwise Polynomial Regression with variable number of regions method may be expressed with the following formula:

$$y = A + \sum_{i=1}^{n} f(Xi) + Error \qquad (\text{eq. 12})$$

where $$f(X_i) = \sum_{k=1}^{H_i} f(Z_{ik})$$

$$\left\{ \begin{array}{c} Z_{ik} = Xi; req_{i0} < Z_{i1} < reg_{i1} \text{ else } reg_{ik-1} \leq Z_{ik} < reg_{ik} \\ Z_{ik} = 0 \end{array} \right\}$$

with $1 \leq H_i \leq H_{Max}$ and where y is the dependent variable, $X_i$ are the independent variables, k is the number of regions, $H_i$ is the maximum number of regions for the i'th independent variable and $Z_{ik}$ are the independent variables of specific regions where $reg_{ik}$ determines the upper border of region k.

For each $$f(Z_{ik}) = \left\{ \text{select one of} \begin{array}{c} B_{ik1} * Z_{ik}^1 \\ B_{ik1} * Z_{ik}^1 + B_{ik2} * Z_{ik}^2 \\ \ldots \\ B_{ik1} * Z_{ik}^1 + B_{ik2} * Z_{ik}^2 + \ldots + B_{ikM} * Z_{ik}^M \end{array} \right\}$$

where A and $B_{ikj}$ denote the unknown coefficients.

Partial Stepwise Polynomial Regression determines region specific regression polynomial, i.e. the fitting curve (eq. 3), in such a manner, that for each region from all potential regression polynomials up to a maximum degree M a specific regression polynomial is selected. The combination of all region specific polynomials determines the regression function of an independent variable. The sum of all regression functions from the independent variables is the regression function for the dependent variable.

1.6.1 Determination of Initial Regions/Sub-Ranges

The initial region borders of the i'th independent variable are defined as $$ireg_{ik} = \left\{ \begin{array}{ll} -\infty & k < 1 \\ C_i - dl_i/2 + \dfrac{dl_i}{H} * k & k \geq 1, k < H \\ \infty & k = H \end{array} \right\} \quad \text{(eq. 13)}$$

where H defines the maximum number of regions, $dI_i$ determines the definition interval for the initial region borders and $C_i$ is a specific center of the i'th independent variable.

A specific implementation of an initial region determination according to the current invention is based on the following features.

The most significant measures describing distributions of data are the mean value and the standard deviation.

The mean value is defined as $$Z_{Mean} = \dfrac{\sum_{i=1}^{n} Z_i}{n} \quad \text{(eq. 14)}$$

the number of observations is n and the standard deviation is the square root of the empirical variance $s=\sqrt{S}$ with the empirical variance:

$$S = \dfrac{\sum_{i=1}^{n}(Z_i - Z_{Mean})^2}{(n-1)} \quad \text{(eq. 15)}$$

Assuming the mean value of the i'th independent variable as center $C_i$ the definition interval $dI_i$ for the region borders as four times of its standard deviation $s_i$ this results in a specific initial region determination of $$ireg_{ik} = \left\{ \begin{array}{ll} -\infty & k < 1 \\ Z_{iMean} - 2s_i + \dfrac{4s_i}{H} * k & k \geq 1, k < H \\ \infty & k = H \end{array} \right\} \quad \text{(eq.13.1)}$$

1.6.2 Determination of the Final Regions/Sub-Regions

The final region borders of the i'th independent variable are defined as $$reg_{ik} = \quad \text{(eq. 15)}$$

$$\text{select one of} \left\{ \begin{array}{c} ireg_{ij} \\ ireg_{i(j+1)} \\ \ldots \\ ireg_{iH_{max}} \end{array} \right\} \left\{ \begin{array}{c} j = k; k = 1 \\ j = j'; reg_{i(k-1)} = reg_{ij'}; k > 1 \end{array} \right\}$$

that the interval $reg_{i(k-1)}$, $reg_{ik}$ contain at least Np disjoint observations of the independent variable $X_i$.

In verbal representation eq. 15 defines a method wherein the sub-ranges (regions) and the corresponding local-data-mining-variables $Z_{ik}$ are of variable size determined by an iterative procedure comprising the following steps:

a. an initial step of dividing the global-range into maximum number H of equidistant sub-ranges (regions), b. an iteration step of selecting a certain sub-range for which the number of the training data falling into a certain sub-range is below a third threshold Np and joining said certain sub-range with a neighbor sub-range forming a larger sub-range, and c. a termination step of terminating the iteration step if for each sub-range the number of the training data falling into said each sub-range is equal to or above the third threshold.

The result of this iterative approach to determine the number and sizes of the sub-ranges results in a situation wherein a size of a sub-range is on one hand large enough to comprise enough training information for calculating a corresponding prediction model, and on the other hand the sizes of the sub-ranges are small enough to take into consideration different functional dependencies in different value ranges of the independent variables.

Further attention should be given to eq. 13.1 with respect to the specific treatment of the two sub-ranges between $-\infty$ and the lower limit of the global-range as well as between the upper limit of the global-range and $+\infty$. As can be seen from this equation, it is suggested that the local-data-mining-variables are augmented by the following sub-ranges and corresponding independent local-data-mining-variables:

1. a local-data-mining-variable representing a sub-range from $-\infty$ up to the lower limit of the global-range; and/or 2. a local-data-mining-variable representing a sub-range from the upper limit of the global-range up to $+\infty$.

The advantage of such approach is that these specific sub-ranges characterized by comprising a limited number of training data only (it is remembered that due to the specific construction of the global-range based on the mean value and the standard deviation of the values of the independent variable as explained above most training data belong to the global-range) nevertheless can participate in a "lump-sum" treatment in the proposed determination procedures. Even though little knowledge on the functional dependency is available in these areas (due to the limited number of training data) the proposed teaching will provide stable prediction models in these sub-ranges.

1.6.3 Example of a Prediction Model Using Variable Number of Regions

In the following a comparison of the result of partial stepwise polynomial regression using a fixed number of regions and of the result of using a variable number of regions is presented. The regression model of the fixed number approach is shown in (sample 3) above.

Using the same training data for the variable number of region approach results in a $R^2$ of 0.9992, where $R^2$ is the squared correlation coefficient between observed and fitted values with the following prediction model:

$$\begin{aligned}
\text{income/capital} = {}& 686734.967 + \\
& 315.724*(AGRI < 25.6) + 10.062*(AGRI < 25.6)^2 - \\
& 0.41441*(AGRI < 25.6)^3 + 53667.040*(AGRI >= 25.6) - \\
& 3053.65*(AGRI >= 25.6)^2 + 39.87*(AGRI >= 25.6)^3 - \\
& 17381.39*(INDUS < 31.58) - \\
& 16136.22*(INDUS >= 31.58 \text{ and } <43.45) - \\
& 42322.28*(INDUS >= 43.45) + \\
& 850.87*(INDUS >= 4.45)^2 - 5.62*(INDUS >= 43.45)^3 - \\
& 1214745.52*(SERVICE < 22.60) + \\
& 77755.95*(SERVICE < 22.60)^2 - \\
& 938.51*(SERVICE < 22.60)^3 + \\
& 620.29*(SERVICE >= 31.15 \text{ and } <39.69) - \\
& 45.80*(SERVICE >= 31.15 \text{ and } <39.69)^2 + \\
& 0.82*(SERVICE >= 31.15 \text{ and } <39.69)^3 + \\
& 0.04*(SERVICE >= 39.69)^3
\end{aligned}$$
(sample 4)

The comparison between (sample 3) and (sample 4) shows that the dynamic solution uses only two regions for the variable AGRI versus 3 regions from the fixed region approach. Any reduction in a number of independent variables (directly related to a reduction of the number of sub-ranges) means an improvement with respect to computational efficiency, that is processing time.

1.7 Extension by Using General Regression Functions Instead of Regression Polynomials In a further embodiment of the current invention its teaching may be readily extended to the calculation of a prediction model based on a multitude of regression functions as a generalization of regression polynomials. The only difference is that within step 106 for every independent local-data-mining-variable (relating to a certain sub-range) not yet reflected in said current prediction-model a multitude of partial regression functions are calculated. A partial regression-function within this context means a regression function (not necessarily a polynomial) which depends on one of the local-data-mining-variables only. The rest of the steps of the above described methodology, like the step of determining a significance value for a partial regression function, the step of selecting the most significant partial regression function and the step of adding the most significant partial regression function to the prediction model can be performed in absolute correspondence to above, regression polynomial based teaching.

The current invention proposes a data mining method for determining a prediction model that allows one to determine the actual polynomial degree of the unknown functional relationship of the dependent and the independent variables. The method can be exploited therefore at same time to generate prediction models for linear and non-linear functional relationships. It is no longer necessary to assume a functional relationship of a common predefined polynomial degree m for all independent variables. As the proposed method is able to determine the actual functional relationship, the prediction quality is improved at the same time. This advantage will even increase for values of the independent variable residing not in the close neighborhood of the training data areas.

Being able to determine the actual functional relationship between the dependent and the independent variable is of special importance in the area of data mining as it is its imperative target to show a user the functional dependencies in analytical terms.

Prediction models determined according to the current invention moreover are characterized by increased computational efficiency in terms of processing time and memory space (compared to prediction models with a comparable number of independent variables) as it avoids the need to compute polynomials for the independent variables with an assumed maximum polynomial degree m even if the functional relationship is of simpler form (for instance linear).

Finally the Stepwise Polynomial Regression is a highly scalable, high performance methodology for the determination of prediction models. It clearly outperforms other methodologies currently viewed as providing the best state of the art scalability behavior.

Further embodiments of the invention allow to determine prediction models with reduced number of independent variables (compared to prediction models wherein the number of independent variables has to be predefined and is not self-adjusted as in the current case), which at the same time improve the quality of the prediction models, as only those independent variables will become part of the prediction model, which improve the prediction quality. This property is of an important computational advantage within data mining as the frequency a prediction model is (re-) computed is low compared to frequency a given prediction model is used to compute the corresponding dependent variable. Finally a reduced number of independent variables provides exploiters of data mining technology a deeper insight in the unknown fundamental functional relationship between the variables. Once this knowledge is available it can be utilized for the provision of new data to be analyzed by data mining techniques: the scope of mining data to be sampled can be limited to those data records comprising the most relevant independent variables only. This leads to cost reduction when applying data mining techniques. Moreover the feature of the invention allowing to determine "prediction models with a reduced number of independent variables" can be expressed in other words as the capability to automatically determine from a large set of independent variables that subset which actually influence the dependent variable. This capability addresses a fundamental data mining problem: the typical starting point for the application of data mining techniques are huge data assets with a lot of different variables for which nobody knows which of the variables are functionally influencing a certain dependent variable. Current state of the art technology requires to rely on human "intuition" or human knowledge for selecting the (hopefully) "correct" independent variables to be included in the prediction model. Furthermore, once a certain set of independent variables has been selected as basis for the prediction model, one never could be sure on the correctness of the selection; i.e. important variables could have been ignored by the human expert or independent variables could have been added with a minor influence on the dependent variable only, which unnecessarily increases the computational complexity of the prediction model. Thus the teaching on the other hand provides a method for automatically determining from the huge set of potential variables those with the most significant functional influence on the independent variable. The prediction quality of a prediction model according to the proposed technology is therefore improved in two directions: first by determining regression polynomials with a polynomial degree adapted to the actual functional dependency; second by determining those independent variables with the most significant influence on the dependent variable. For experienced exploiters of data mining technology the proposed teaching helps to reduce the effort to identify those portions of the huge data assets being of relevance for the prediction models to be computed. For other addressees, not having the knowledge on the functional dependencies of variables, the current invention may represent the enabling technology for exploitation of data mining techniques altogether.

I claim:

1. A computerized data mining method for automatically determining a most significant prediction model for a dependent data mining variable based on at least one independent data mining variable, said method comprising the following steps: a variable replacement step (103) replacing said independent data mining variable with potential values from a global range by a plurality of independent local data mining variables, each independent local data mining variable with potential values from a subrange of said global range; an initialization step (104) initializing a current prediction model; a looping sequence (105–108) including a first step (106) having substeps of determining for every independent local data mining variable not yet reflected in a current prediction model a multitude of partial regression functions, each partial regression function depending only on one of said independent local data mining variables; determining for each of said partial regression functions a significance value; selecting the most significant partial regression function and the corresponding not yet reflected local data mining variable; and a second step (107) of adding said most significant partial regression function to said current prediction model and of associating said corresponding local data mining variable with said significance value, in said variable replacement step said global range being defined by its center defined by the mean value of training data used for the determination of the most significant prediction model, and by a lower and upper limit with a distance from said center being a predefined multiple of the standard deviation of said training data, and said subranges and said corresponding local data mining variables are defined as a fixed number h of subranges by dividing said global range into h equidistant subranges.

2. The method according to claim 1, wherein in said second step said most significant partial regression function is added only if its inclusion improves the adjusted correlation coefficient of the prediction model, and otherwise excluding said local data mining variable corresponding to said most significant partial regression function from said method.

3. The method according to claim 2, wherein in said second step said most significant partial regression function is added if its significance is above a threshold significance, and wherein said looping sequence includes a third step of determining if the significance of a certain partial regression function comprised within said current prediction model is reduced after execution of said second step and, in the affirmative case, removing said certain partial regression function with its corresponding local data mining variable from said current prediction model.

4. The method according to claim 3, wherein said looping sequence terminates if all local data mining variables are reflected in said current prediction model.

5. The method according to claim 3, wherein said looping sequence terminates if the significance of said most significant partial regression function is below a second threshold significance.

6. The method according to claim 1, wherein in said initialization step said initialized current prediction model is empty.

7. The method according to claim 1, wherein said partial regression functions are regression polynomials.

8. The method according to claim 7, wherein said significance is determined by calculating the significance of all powers of a regression polynomial and using the minimum significance of said powers as significance measure of said regression polynomial.

9. The method according to claim 8, wherein said calculating of said significance of said powers is based on F-test values for coefficients of said powers.

10. The method according to claim 7, wherein said plurality of regression polynomials within said first step is determined by determining regression polynomials of all degrees up to a maximum degree M.

11. The method according to claim 1, wherein in said subranges and said corresponding local data mining variables are of variable size defined by the following steps: (a) an initial step of dividing said global range into maximum number H of equidistant subranges; (b) an iteration step of selecting a certain subrange for which the number of said training data falling into said certain subrange is below a third threshold Np and joining said certain subrange with a neighbor subrange forming a larger subrange; and (c) a termination step terminating said iteration step if for each subrange the number of said training data falling into said each subrange is equal to or above said third threshold.

12. The method according to claim 1, wherein said local data mining variables are augmented by the following subranges and corresponding independent local data mining variables: a local data mining variable representing a subrange from $-\infin$ up to said lower limit of said global range; and a local data mining variable representing a subrange from said upper limit of said global range up to $+\infin$.

13. A computer system comprising means adapted for carrying out the steps of a computerized data mining method for automatically determining a most significant prediction model for a dependent data mining variable based on at least one independent data mining variable, said method comprising the following steps: a variable replacement step (103) replacing said independent data mining variable with potential values from a global range by a plurality of independent local data mining variables, each independent local data mining variable with potential values from a subrange of said global range; an initialization step (104) initializing a current prediction model; a looping sequence (105–108) including a first step 106 having substeps of determining for every independent local data mining variable not yet reflected in a current prediction model a plurality of partial regression functions, each partial regression function depending only on one of said independent local data mining variables; determining for each of said partial regression functions a significance value; selecting the most significant partial regression function and the corresponding not yet reflected local data mining variable; and a second step (107) of adding said most significant partial regression function to said current prediction model and of associating said corresponding local data mining variable with said significance value in said variable replacement step said global range being defined by its center defined by the mean value of training data used for the determination of the most significant prediction model, and by a lower and upper limit with a distance from said center being a predefined multiple of the standard deviation of said training data, and said subranges and said corresponding local data mining variables are defined as a fixed number h of subranges by dividing said global range into h equidistant subranges.

14. A computer program product comprising a machine-readable medium having computer-executable program instructions thereon including code means for causing a computer to perform a computerized data mining method for automatically determining a most significant prediction model for a dependent data mining variable based on at least one independent data mining variable, said method comprising the following steps: a variable replacement step (103) replacing said independent data mining variable with potential values from a global range by a plurality of independent local data mining variables, each independent local data mining variable with potential values from a subrange of said global range; an initialization step (104) initializing a current prediction model; a looping sequence (105–108) including a first step (106) having substeps of determining for every independent local data mining variable not yet reflected in a current prediction model a plurality of partial regression functions, each partial regression function depending only on one of said independent local data mining variables; determining for each of said partial regression functions a significance value; selecting the most significant partial regression function and the corresponding not yet reflected local data mining variable; and a second step (107) of adding said most significant partial regression function to said current prediction model and of associating said corresponding local data mining variable with said significance value in said variable replacement step said global range being defined by its center defined by the mean value of training data used for the determination of the most significant prediction model, and by a lower and upper limit with a distance from said center being a predefined multiple of the standard deviation of said training data, and said subranges and said corresponding local data mining variables are defined as a fixed number h of subranges by dividing said global range into h equidistant subranges.

* * * * *